United States Patent [19]

Takenaka

[11] Patent Number: 5,344,513
[45] Date of Patent: Sep. 6, 1994

[54] METHOD OF MANUFACTURING LAMINATED TRANSPARENT SUBSTRATE HAVING BIREFRINGENCE

[75] Inventor: Shunji Takenaka, Yokohama, Japan

[73] Assignee: Stanley Electric Co., Ltd., Tokyo, Japan

[21] Appl. No.: 71,040

[22] Filed: Jun. 1, 1993

Related U.S. Application Data

[63] Continuation of Ser. No. 747,024, Aug. 19, 1991, abandoned.

[30] Foreign Application Priority Data

Aug. 28, 1990 [JP] Japan .................................. 2-226397

[51] Int. Cl.$^5$ ...................... B32B 17/10; G02F 1/133
[52] U.S. Cl. .................... 156/106; 156/103; 156/104; 156/105; 156/285; 156/306.6; 359/73; 359/494; 359/499; 359/500
[58] Field of Search .................. 156/99, 100, 103–106, 156/311, 306.6; 428/426, 334, 1; 359/73, 494, 499, 500

[56] References Cited

U.S. PATENT DOCUMENTS

| | | | |
|---|---|---|---|
| 3,532,590 | 10/1970 | Priddle | 156/311 |
| 4,385,806 | 5/1983 | Fergason . | |
| 4,619,973 | 10/1986 | Smith, Jr. | 264/176.1 |
| 4,663,228 | 5/1987 | Bolton et al. | 156/99 |
| 4,701,028 | 10/1987 | Clerc et al. . | |
| 4,813,770 | 3/1989 | Clerc et al. | 359/73 |
| 4,863,540 | 9/1989 | Catalano et al. | 156/311 |
| 5,171,488 | 12/1992 | Hirose | 264/2.6 |

FOREIGN PATENT DOCUMENTS

| | | |
|---|---|---|
| 0239433 | 9/1987 | European Pat. Off. . |
| 1462978 | 1/1977 | United Kingdom . |

*Primary Examiner*—Jeff H. Aftergut
*Attorney, Agent, or Firm*—Nixon & Vanderhye

[57] ABSTRACT

A method of manufacturing a laminated transparent substrate comprising the steps of sandwiching between transparent glass substrates ionomer resin formed by bridging ethylenemetacryl acid copolymars with sodium ions, to form a laminated structure and sealing it in a reduced pressure atmosphere; applying heat and pressure to said laminated structure; rapidly decreasing the pressure applied to said laminated structure; and then rapidly decreasing the temperature of said laminated structure.

7 Claims, 2 Drawing Sheets

METHOD OF MANUFACTURING LAMINATED TRANSPARENT SUBSTRATE HAVING BIREFRINGENCE

This is a continuation of application Ser. No. 07/747,024, filed Aug. 19, 1991, now abandoned.

BACKGROUND OF THE INVENTION

1. Field of the Invention

This invention relates to a method of manufacturing a laminated transparent substrate, and more particularly to a method manufacturing a laminated transparent substrate having a controlled optical property.

2. Description of the Related Art

Laminated transparent substrates formed by sandwiching thermo-plastic resin between a pair of transparent substrates, such as glass plates, are used for several usages. One of the producing methods therefor is adhering a plurality of glass plates with a resin layer or layers. Another of the producing methods is applying pressure from both sides of a resin layer to develop uniaxial compression, for example by rolling, to provide a controlled optical property such as birefringence.

Autoclaving is employed for manufacturing laminated safety glass plate for use as a front glass in automobiles, etc. In autoclaving, a workpiece is heated under pressure application. Heating is clone by an oil bath or an electric furnace.

Some color superhomeotropic (CSH) liquid crystal display devices use an optical compensation plate having a negative optical anisotropy for compensating the birefringence (positive optical anisotropy) of the liquid crystal layer for compensating the optical anisotropy of a liquid crystal layer formed of a certain liquid crystal and having a certain thickness, a transparent birefringence plate having the opposite optical anisotropy is desired as the compensation plate. It is, however, not easy to produce a birefringence plate having the desired optical anisotropy.

SUMMARY OF THE INVENTION

An object of this invention is to provide a method of manufacturing a laminated transparent substrate having a controlled optical property such as birefringence.

According to an aspect of this invention, there is provided a method of manufacturing a laminated transparent substrate comprising the steps of: sandwiching between transparent substrates ionomer resin to form a laminated structure and sealing it in a reduced pressure atmosphere; applying heat and pressure to said laminated structure; and rapidly decreasing the pressure applied to said laminated structure, and then rapidly decreasing the temperature of said laminated structure.

According to this method, a laminated transparent substrate having a desired optical property can be easily provided.

DESCRIPTION OF THE PREFERRED EMBODIMENTS

Before describing the embodiments of this invention, autoclaving will be described referring to FIGS. 2 and 3.

Figure 2:
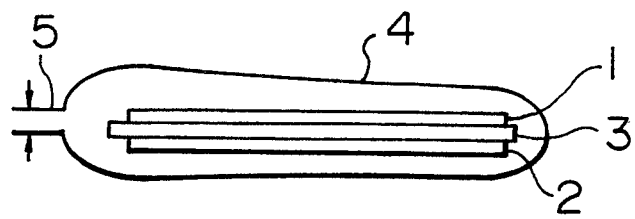
FIG. 2 is a schematic cross sectional diagram showing the structure off lamination to be loaded in an autoclave apparatus.
Figure 3:
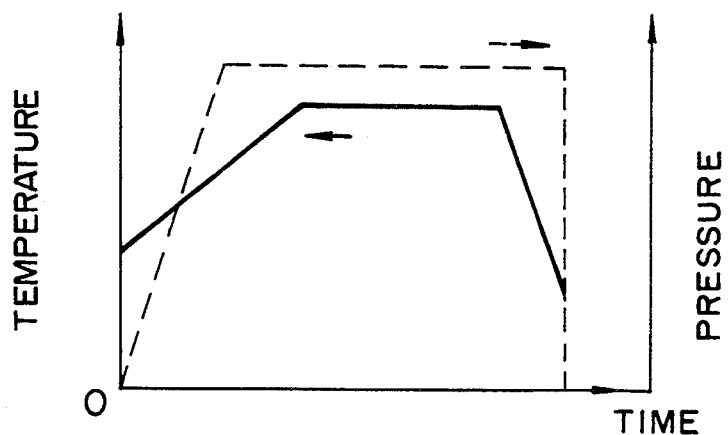
FIG. 3 is a graph showing pattern of temperature and pressure control in a conventional autoclaving method.

As shown in FIG. 2, a thermo-plastic resin film 3 such as a polyvinylbutyral resin film is sandwiched between a pair of glass plates 1 and 2 to form a laminated structure. This laminated structure is loaded in an evacuatable hermetic bag 4. The glass plates 1 and 2 are, for example, made of reinforced glass plates. The material of the resin film 3 is selected from transparent resins having high strength. The inside of the bag 4 is evacuated through an open end 5 then the open end 5 is sealed. The laminated structure which is vacuum-packed in the bag 4 in this way is then loaded in an autoclave apparatus. The temperature and pressure in the autoclave apparatus are then controlled to vary as shown in FIG. 3. Namely, at the same time as the commencement of pressure application, the temperature is raised. When the pressure arrives at a predetermined value, it is kept at the constant pressure. When the temperature then arrives at a predetermined value, it is kept at the constant temperature.

When a predetermined time period has passed while keeping the predetermined pressure and temperature, first the temperature is lowered. When the temperature has decreased to a predetermined temperature, then the pressure is rapidly decreased to zero. A pair of glass plates are adhered by a resin film by such process.

There is a method of forming a uniaxial anisotropic optical medium having the principal axis in the thickness direction of the film, by sandwiching a resin film between a pair of transparent substrates such as glass plates and applying pressure and temperature thereto.

For example ionomer resins known as HI-MILAN (trade name), available from Mitsui Du-pont Polychemical, Japan, which are formed by bridging ethylene acryl acid or ethylene metacryl acid copolymer molecules with metal ions have such property.

Thus, it can be considered to manufacture a transparent optical medium having a desired anisotropic refractive index distribution by sandwiching a HI-MILAN resin film between a pair of glass plates and subjecting it to pressure and heat treatment. When a HI-MILAN resin is treated by the autoclave method, however, the resin film may become opaque and it is difficult to obtain a transparent optical medium.

In case of an optical compensation plate for use in a liquid crystal display utilizing polarizers, when milky opaque, i.e. scattering of light, occurs, the contrast becomes significantly low. Also, when the thickness of the resin film is thick, such as 0.5 mm, the processed film may become a white film.

When a resin film having been subjected to pressure and heat treatment is gradually cooled, it can be considered that the alignment state of the molecules become disturbed during the gradual cooling. Thus, the optical property of the resin film obtained after the gradual lowering of the temperature and the pressure becomes different from those when the pressure and the heat application treatment has done.

It is considered that when the resin film is quenched from a heated state to a low temperature, the molecular alignment at a high temperature state can be conserved.

However, it is not easy to rapidly lower the temperature when the pressure is kept at a high value. If such an apparatus is made, the cost of it will become very high.

Thus, first the pressure is rapidly lowered and then the temperature is rapidly lowered. It can be considered that the alignment state of the molecules obtained by the pressure and heat application treatment can be substantially quenched as it is by such a treatment.

When the temperature is rapidly cooled after the pressure is rapidly lowered, it is considered that the alignment state of the molecules in the treated film may not be significantly varied, and may be conserved.

Hereinunder, embodiments of this invention will be described, which treats an ionomer resin film by applying pressure and heal, to obtain a laminated transparent substrate. The ionomer resin is Formed by bridging ethylene acryl acid or ethylene metacryl acid copolymer molecules with metal ions such as sodium ions.

As shown in FIG. 2, a HI-MILAN film 3 is sandwiched between a pair glass plates i and 2 and loaded in an evacuatable bag 4. Then, the bag 4 is sealed after evacuation. The bag 4 thus vacuum-packed is then loaded in an autoclave apparatus.

Figure 1:
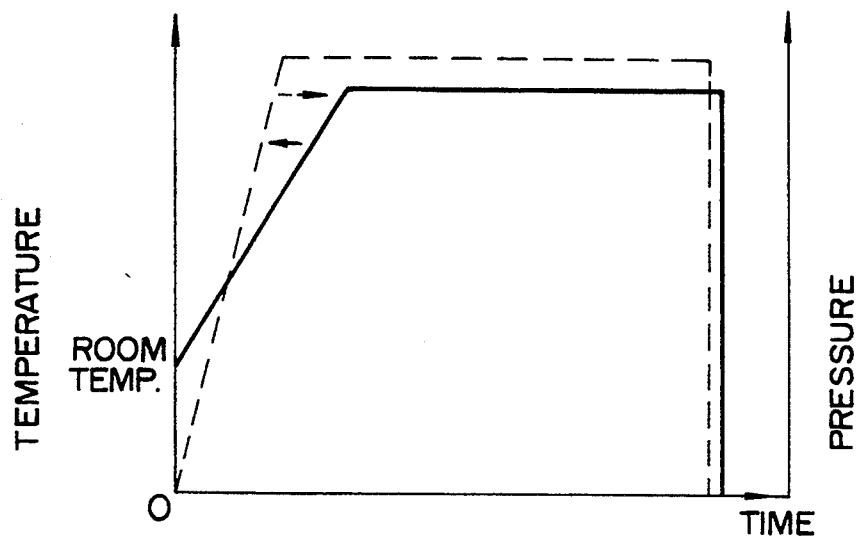
FIG. 1 is a graph showing patterns of temperature and pressure control for explaining a method of manufacturing a laminated transparent substrate according to an embodiment of this invention.

The temperature and the pressure in the autoclave apparatus are then controlled as shown in FIG. 1. Namely, the temperature is gradually raised from the room temperature to a predetermined temperature of 100-150° C., and also the pressure in the autoclave apparatus is raised to a predetermined pressure of 1-5 atms. In this step, first the pressure reaches the predetermined value of 1-5 atms, and then the gradually heated temperature reaches the predetermined value of 100-150° C. When the temperature and the pressure reach the predetermined values, they are kept constant at these constant values thereafter. When treatment at the predetermined temperature and pressure has been done for a predetermined time period (for example, for about 30 min.), first the pressure is lowered rapidly. For example, the pressure in the autoclave apparatus is rapidly lowered while the temperature is kept at the high temperature. After the pressure has been decreased, the temperature is then rapidly decreased. For example, the vacuum packed lamination structure is taken out from the pressure-lowered autoclave apparatus, and then it is swiftly transferred into a circulation type low temperature furnace kept at −20° C. The laminated structure is kept in the low temperature furnace for about 30 minutes or more.

The laminated transparent substrate thus treated shows the predetermined optical property, while keeping the transparent state.

It can be considered that molecules in the film realize the predetermined aligned state in the predetermined pressure and heat application step. If this state can be quenched, an optical device having the desired anisotropy can be obtained.

Occurrence of milky opaque of the transparent substrate can be suppressed by the manufacturing methods as described above.

Examples of the above embodiment will be described below. Laminated transparent substrate are made under the following conditions.

| | |
|---|---|
| thickness of the HI-MILAN sheet | 0.5 mm |
| thickness of glass plate (per one plate) | 0.7 mm |
| autoclaving temperature | 120° C. |
| autoclaving pressure | 3 kg/cm² |
| temperature before quenching | |
| after unloading from autoclaving furnace | ca 100° C. |
| temperature of low temperature furnace | −20° C. |

The optical anisotropy $\Delta n$ obtained were $-1.4 \times 10^{-3}$ for HI-MILAN 1601 (Na ion type), $-0.9 \times 10^{-3}$ for HI-MILAN 1605 (Na ion type), $-1.3 \times 10^{-3}$ for HI-MILAN 1555 (Na ion type), $-0.9 \times 10^{-3}$ for HI-MILAN 0707 (Na ion type) and $-0.9 \times 10^{-3}$ for HI-MILAN AM 7311 (Mg ion type). The haze of the manufactured laminated transparent substrate was about 0.2%.

For comparison, laminated transparent substrate which were cooled naturally to the room temperature without quenching according to the conventional method were also made. The haze of the conventionally made laminated transparent substrates was about 1.5%.

Accordingly, a clear improvement was found in the examples of the present embodiment.

Further, it is possible to anneal the treated laminated substrate at a temperature higher than the use temperature, e.g. room temperature, and lower than the treatment temperature before quench, e.g. ca 100° C.

Figure 4:
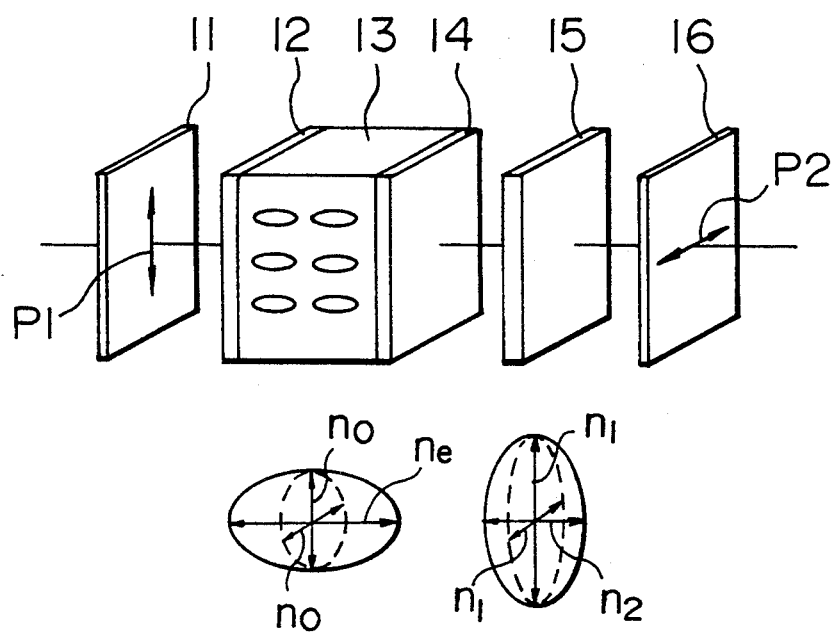
FIG. 4 is a schematic diagram showing a liquid crystal display device.

FIG. 4 shows a liquid crystal display device. A homeotropic liquid crystal layer 13 is sandwiched between a pair of glass substrates 12 and 14 provided with electrodes. A pair of crossed polarizers 11 and 16 having crossed polarization axes P1 and P2 are positioned outside the liquid crystal cell. An optical compensator film 15 manufactured according to the above-described embodiment is inserted between the liquid crystal cell 12, 13, 14 and one of the polarizers 16.

When the liquid crystal molecules in the liquid crystal layer 13 is aligned perpendicular to the substrates. A positive optical anisotropy is established. The compensator plate 15 has a negative optical anisotropy to compensate the positive optical anisotropy of the liquid crystal layer 13.

Although description has been made along the embodiment of this invention, the present invention is not limited thereto. For example, such ionomer resin films utilizing metal ions other than sodium ion can be employed and processed in a similar manner. Here, however, the ionomer resin film using sodium ion has a larger difference in the magnitudes of the refractive indice for the ordinary ray and extraordinary ray, than the ionomer resin films using other metal ions such as magnesium ion. Therefore, the ionomer resin film utilizing sodium ion can realize a predetermined refractive index difference by a thinner thickness. The ionomer resin film utilizing sodium ion has a tendency of lowering the transparency. Thus, the method of the above embodiments is particularly effective.

It will be obvious for those skilled in the art that various changes, alterations, combinations and improvements are possible within the scope of this invention.

I claim:

1. A method of manufacturing an optical compensator having a negative anisotropy comprising the successive steps of:
   (a) sandwiching between a pair of transparent substrates an ionomer resin, to form an optical compensator having a negative anisotropy and sealing it in a reduced pressure atmosphere;
   (b) applying heat to and increasing the pressure on said optical compensator;

(c) while maintaining said optical compensator at a high temperature rapidly decreasing the pressure applied to said optical compensator; and thereafter (d) quenching and rapidly decreasing the temperature of said optical compensator thereby providing negative anisotropy to said optical compensator.

2. The method of manufacturing an optical compensator having a negative anisotropy according to claim 1, wherein said ionomer resin is formed by bridging ethylene metacryl acid copolymers with metal ions.

3. The method of manufacturing an optical compensator having a negative anisotropy according to claim 2, wherein said ionomer resin contains sodium ions.

4. The method of manufacturing an optical compensator having a negative anisotropy according to claim 1, wherein the heat and the increase in pressure applied to step (b) are conducted in an autoclave.

5. The method of manufacturing an optical compensator having a negative anisotropy according to claim 4, wherein the step of rapid quenching the optical compensator is achieved by removing the optical compensator from the autoclave and placing it in a low temperature furnace.

6. The method of manufacturing an optical compensator having a negative anisotropy according to claim 1, wherein step (b) raises the temperature of the substrate to 100–150° C.

7. The method of manufacturing an optical compensator having a negative anisotropy according to claim 1, wherein step (b) increases the pressure to 1–5 atms.

* * * * *